US006998806B2

(12) United States Patent
Suzuki

(10) Patent No.: US 6,998,806 B2
(45) Date of Patent: Feb. 14, 2006

(54) MOTOR STOP CONTROL DEVICE FOR GAMING MACHINE AND GAMING MACHINE WITH THE SAME

(75) Inventor: Yuuichirou Suzuki, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 10/986,815

(22) Filed: Nov. 15, 2004

(65) Prior Publication Data

US 2005/0110443 A1 May 26, 2005

(30) Foreign Application Priority Data

Nov. 21, 2003 (JP) ............................ 2003-392452

(51) Int. Cl.
*H02P 7/00* (2006.01)

(52) U.S. Cl. ...................... 318/432; 318/811; 318/599; 318/685; 318/696; 273/143 R; 463/16; 463/20

(58) Field of Classification Search ........ 318/432–434, 318/599, 811, 685, 696; 273/143 R; 463/16, 463/20

See application file for complete search history.

(56) References Cited

U.S. PATENT DOCUMENTS

| | | | | |
|---|---|---|---|---|
| 4,373,727 A * | 2/1983 | Hooker et al. | .......... | 273/143 R |
| 4,540,106 A * | 9/1985 | Fukatsu | ....................... | 221/13 |
| 4,591,774 A * | 5/1986 | Ferris et al. | ................ | 318/696 |
| 4,772,022 A | 9/1988 | Yoshitomi | | |
| 4,912,389 A | 3/1990 | Eguchi | | |
| 4,988,938 A | 1/1991 | Ito et al. | | |
| 5,024,439 A * | 6/1991 | Okada | ..................... | 273/143 R |
| 5,667,219 A * | 9/1997 | Ishibashi | ................ | 273/143 R |
| 6,540,227 B2 * | 4/2003 | Inoue | ..................... | 273/143 R |
| 6,726,204 B2 * | 4/2004 | Inoue | ..................... | 273/143 R |

FOREIGN PATENT DOCUMENTS

| | | |
|---|---|---|
| EP | 0 414 427 A2 | 2/1991 |
| EP | 0 660 279 A2 | 6/1995 |
| EP | 0 676 859 A1 | 10/1995 |
| JP | 10-071240 | 3/1998 |

* cited by examiner

*Primary Examiner*—Rina Duda
(74) *Attorney, Agent, or Firm*—Arent Fox PLLC

(57) ABSTRACT

In the gaming machine, when the motor drive instruction to drive the motor occurs based on an instruction from an external, a constant voltage is applied to the motor and the motor is driven through the motor drive circuit 39. And when the excitation current value flowing in the motor becomes the first current value based on the constant voltage applied to the motor through the motor drive circuit 39, the voltage with on-time and off time is repeatedly applied to the motor through the motor drive circuit 39. Further, when the rotation speed of the motor becomes constant based on the voltage with on-time and off-time applied through the motor drive circuit 39, the constant voltage is applied to the motor based on the motor stop instruction through the motor drive circuit 39, thereby the motor is stopped.

3 Claims, 10 Drawing Sheets

MOTOR STOP CONTROL DEVICE FOR GAMING MACHINE AND GAMING MACHINE WITH THE SAME

CROSS-REFERENCE TO THE RELATED APPLICATION (S)

This application is based upon and claims a priority from the prior Japanese Patent Application No. 2003-392452 filed on Nov. 21, 2003, the entire contents of which are incorporated herein by reference. This application is related to co-pending U.S. applications entitled "MOTOR STOP CONTROL DEVICE UTILIZABLE FOR REEL-TYPE GAMING MACHINE", filed on Apr. 29, 2004, and "MOTOR STOP CONTROL DEVICE FOR GAMING MACHINE AND GAMING MACHINE PROVIDED WITH THE MOTOR STOP CONTROL DEVICE", filed on Jul. 30, 2004 and "MOTOR DRIVE CONTROL DEVICE UTILIZABLE FOR REEL-TYPE GAMING MACHINE", filed on Sep. 9, 2004 and "MOTOR STOP CONTROL DEVICE UTILIZABLE FOR GAMING MACHINE AND GAMING MACHINE USING THE SAME", filed on Sep. 15, 2004, "MOTOR STOP CONTROL DEVICE UTILIZABLE FOR GAMING MACHINE AND GAMING MACHINE USING THE SAME", filed on Sep. 30, 2004. The co-pending applications are expressly incorporated herein by reference.

BACKGROUND OF THE INVENTION

1. Field of the Invention

The present invention relates to a motor stop control device utilizable for a reel-type gaming machine, such gaming machine having motors as drive sources of reels on each of which a plurality of symbols are formed and the motors being driven corresponding to an instruction command transmitted from an external.

2. Description of Related Art

Conventionally, in a symbol display device, which variably displays symbols, utilized in a reel-type gaming machine (for example, a Japanese Pachi-slot machine), as shown in Unexamined Japanese Patent Publication No. 10-71240, it is utilized a circuitry construction through which the reel on which a plurality of symbols are formed is rotated by applying a predetermined voltage value (for example, 24V) to the motor which is driven by such predetermined voltage value.

However, in the above circuitry construction, although a current flows in the motor by applying a predetermined voltage to the motor, the current has a characteristics of a first order lag against the voltage, therefore there is a problem that the motor cannot be efficiently driven.

On the contrary, it is well-known a chopping circuitry construction (this drive manner is called as "constant current drive manner") in which a voltage applied to the motor is turned on and off at a high speed and the current flowing in the motor is controlled so as to almost become the maximum current value permitted to flow in the motor, when the current flowing in the motor becomes the maximum current permitted to flow therein while making the current rapidly rise up by lowering the resistance value of the motor. According to the chopping circuitry construction, the motor is efficiently driven.

On the other hand, when the motor is stopped, it is required to transmit a stop control signal and to apply a constant voltage to the motor, in order to control the reels to stop first. This leads to stopping the reels first from the viewpoint of control circuit, since the reels cannot be physically stopped at the same time as the transmittance of the stop control signal. Stopping the reels first from the viewpoint of control circuit is required for laws and regulations for a gaming machine, as in Japan.

Therefore, it is desired for a long time to develop the motor stop control device by which the motor can be efficiently driven and the reel can be stopped first when the reel is stopped by the motor.

SUMMARY OF THE INVENTION

The present invention has been done in order to dissolve the above problems and has an object to provide a motor stop control device in which a motor can be efficiently driven and a constant voltage can be applied to the motor when the motor is stopped, thereby the reel can be stopped first, and to provide a gaming machine with the motor stop control device.

According to one aspect of the present invention, it is provided a motor stop control device for a gaming machine comprising a motor as a drive source of a reel on which a plurality of symbols are formed, wherein the motor stop control device stops the motor based on a motor stop instruction, the motor stop control device further comprising:

a motor drive device for driving the motor by applying a constant voltage to the motor based on a motor drive instruction;

a voltage applying device for applying a voltage with on-time and off-time to the motor when an excitation current value flowing in the motor reaches to a predetermined first current value based on the constant voltage applied to the motor through the motor drive device; and a motor stop device for stopping the motor by applying the constant voltage to the motor based on the motor stop instruction when a rotation speed of the motor becomes constant while the voltage with on-time and off-time is applied to the motor by the voltage applying device.

Further, according to another aspect of the present invention, it is provided a gaming machine with a motor stop control device comprising a motor as a drive source of a reel on which a plurality of symbols are formed, wherein the motor stop control device stops the motor based on a motor stop instruction, the motor stop control device further comprising:

a motor drive device for driving the motor by applying a constant voltage to the motor based on a motor drive instruction;

a voltage applying device for applying a voltage with on-time and off-time to the motor when an excitation current value flowing in the motor reaches to a predetermined first current value based on the constant voltage applied to the motor through the motor drive device; and a motor stop device for stopping the motor by applying the constant voltage to the motor based on the motor stop instruction when a rotation speed of the motor becomes constant while the voltage with on-time and off-time is applied to the motor by the voltage applying device.

According to the above motor stop control device, it is executed a chopping control in which the voltage with on-time and off-time is repeatedly applied to the motor when the motor is started to rotate and is rotating at the constant speed and the stop control without the above chopping control is executed at the time that the motor is stopped. Accordingly, the motor stop control device can efficiently drive the motor when the motor is started to rotate and is rotating at the constant speed and the constant voltage can be applied to the motor when the motor is stopped, therefore the reel can be stopped first.

As mentioned in the above, the present invention can provide the motor stop control device and the gaming machine with the motor stop control device through which the motor can be efficiently driven and the constant voltage can be applied to the motor when the motor is stopped, therefore the reel can be stopped first.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 8 is an explanatory view showing timing charts in which a relation among a control signal, a voltage applied to a stepping motor and an excitation current flowing in the stepping motor is indicated.

DETAILED DESCRIPTION OF THE PREFERRED EMBODIMENTS (Basic Construction of Motor Drive Control Device)

Figure 1:
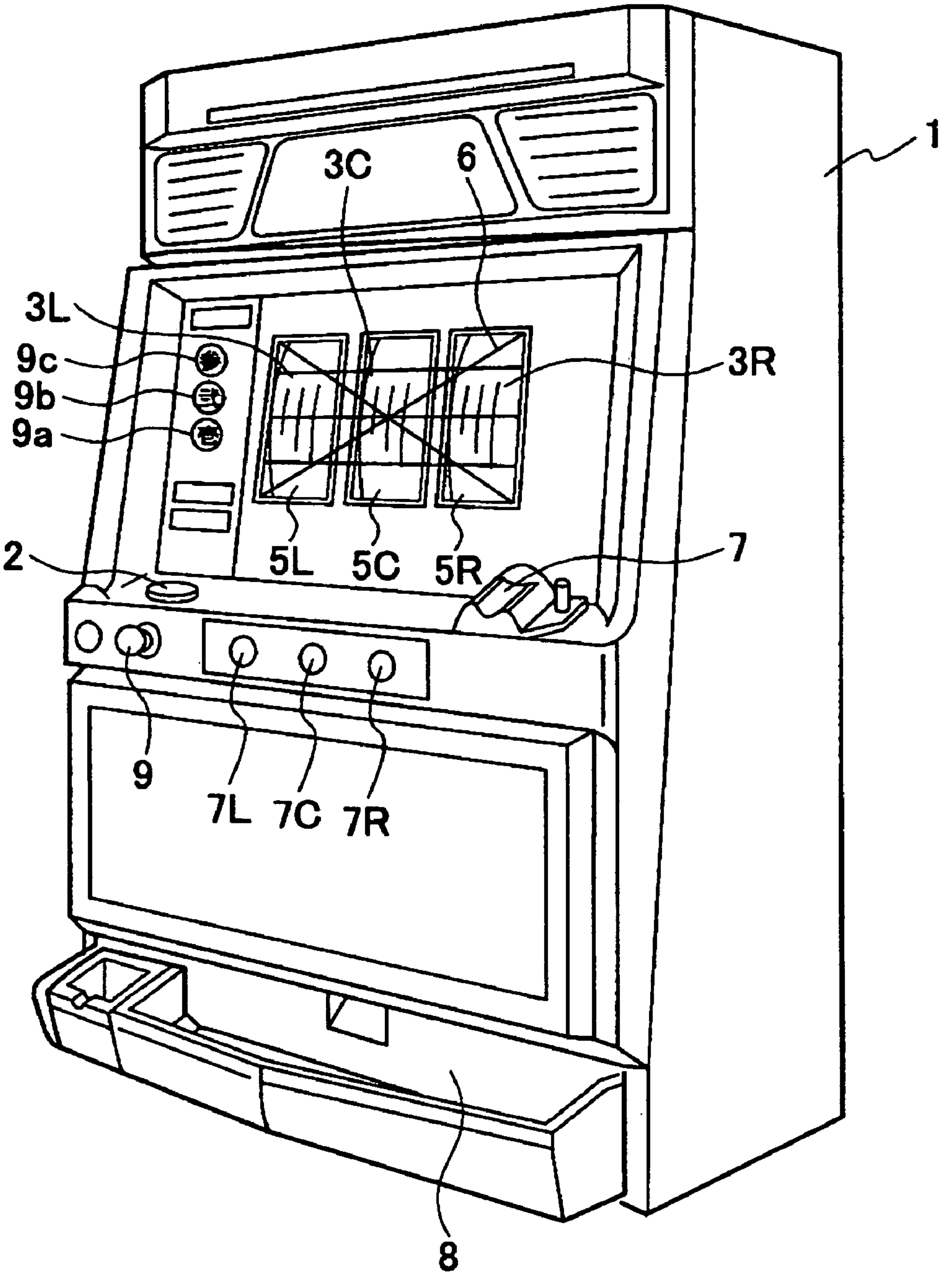
FIG. 1 is a perspective view of a gaming machine according to the embodiment.

The motor stop control device of the embodiment will be described with reference to the drawings. FIG. 1 is a perspective view of a reel-type gaming machine according to the embodiment.

As shown in FIG. 1, in front of a cabinet forming a whole construction of the reel-type gaming machine 1, three panel display windows 5L, 5C, 5R are formed. Reels 3L, 3C, 3R constructing a reel unit are seen and recognized through the panel display windows 5L, 5C, 5R, respectively. And on the panel display windows 5L, 5C, 5R, three pay lines 6 are described along three horizontal directions and two pay lines 6 are described along two oblique directions. These pay lines 6 are made effective according to the number of coins inserted through an insertion slot 7 and the number of pay lines 6 are determined.

Each of the reels 3L, 3C, 3R starts to rotate when a player inserts coins in the insertion slot 7 and operates a start lever 9. And when the player presses stop buttons 7L, 7C, 7R arranged corresponding to the reels 3L, 3C, 3R respectively, rotation of the reels 3L, 3C, 3R is stopped. Further, based on symbol combination of each of reels 3L, 3C, 3R which are seen and recognized through each of the panel display windows 5L, 5C, 5R when rotation of the reels 3L, 3C, 3R is stopped, winning mode is determined. And when winning is obtained, coins the number of which corresponds to the winning mode are paid out to a coin tray 8.

Figure 2:
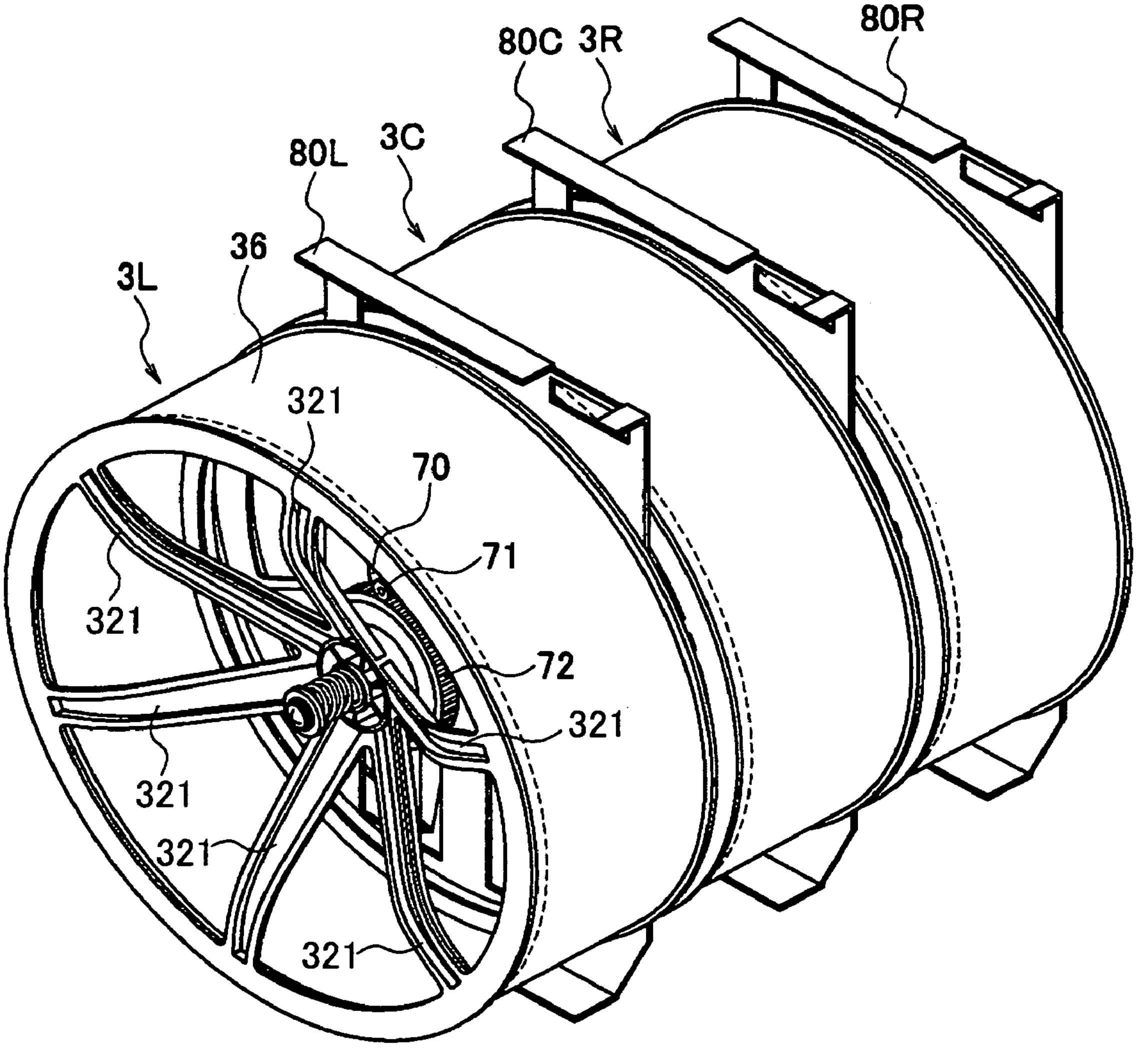
FIG. 2 is a perspective view showing a construction of reels when obliquely seeing the reels in the embodiment.

FIG. 2 is a perspective view showing the construction of the reel unit arranged within the panel display windows 5L, 5C, 5R. As shown in FIG. 2, the reel unit has three support plates 80L, 80C, 80R, three reels 3L, 3C, 3R arranged inside of each support plate 80L, 80C, 80R, respectively, and three stepping motors 49L, 49C, 49R of PM type rotating the reels 3L, 3C, 3R, respectively.

Hereinafter, for convenience sake of explanation, although description will be done to limit to the left reel 3L (reel 3), the left support plate 80L (support plate 80), the left stepping motor 49L (stepping motor 490), among three reels 3L, 3C, 3R, three support plates 80L, 80C, 80R, three stepping motors 49L, 49C, 49R, the other reels 3C, 3R, the other support plates 80C, 80R, the other stepping motors 49C, 49R have the same construction as those of the reel 3L, the support plate 80L, the stepping motor 49L, so long as explanation is not especially referred.

Figure 3:
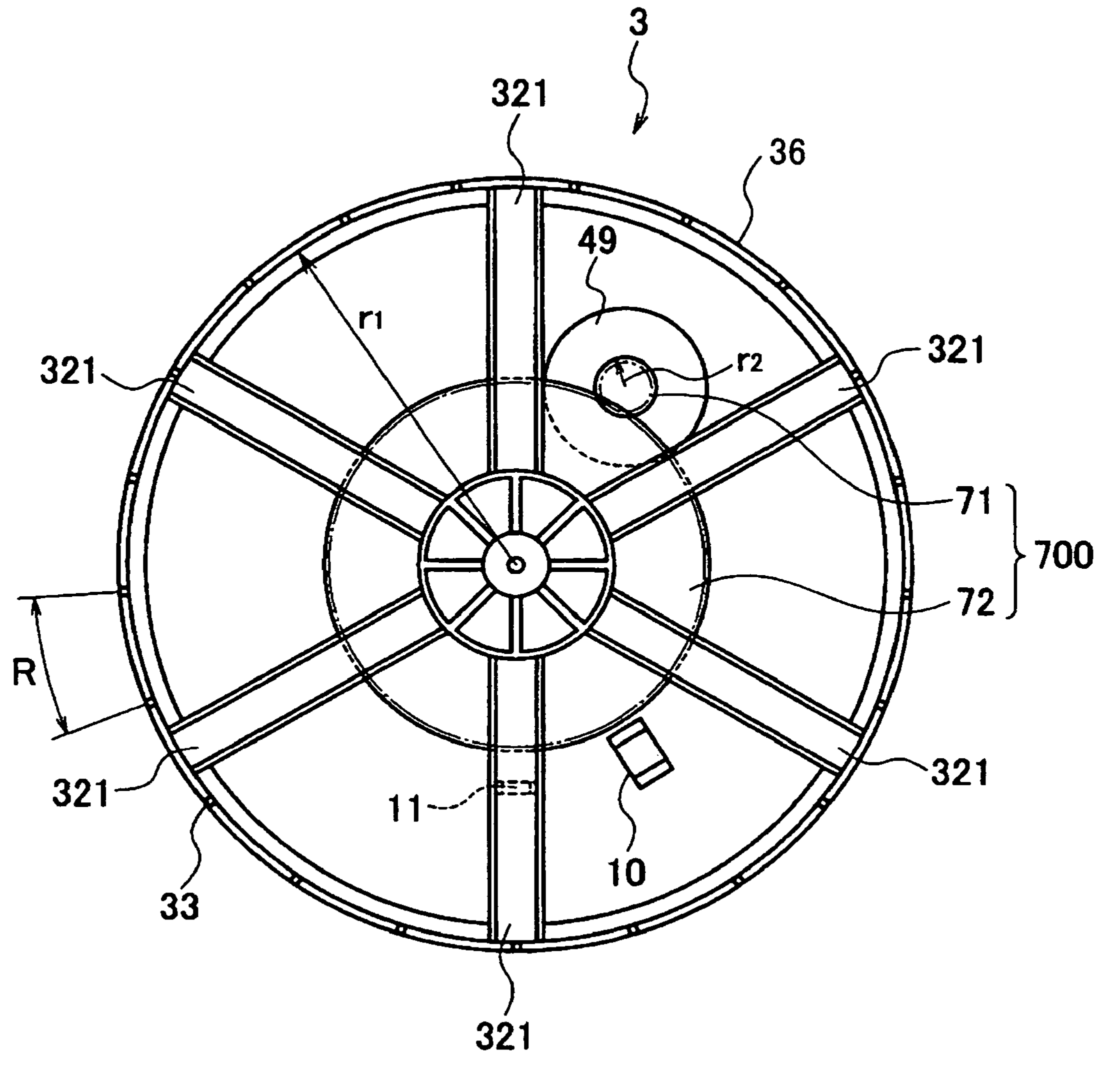
FIG. 3 is a side view of the reel in the embodiment.

FIG. 3 is the left side view of the reel 3. As shown in FIG. 3, on the support plate 80 (not shown), it is arranged a position detecting sensor 10 for detecting the rotation position of the reel 3 and functioning as the reel position detecting circuit, within the rotation radius r1 of the reel 3. The reel 3 is rotatably supported to a reel post 76 which corresponds to the center of the reel 3 and is extended normally to the plane of the support plate 80 (see FIG. 4).

As shown in FIG. 3, the reel 3 is constructed from six arms 321 extending spokewise from the center of the reel 3 and a cylindrical member 36 integrally formed so that top ends of the arms 321 are connected thereto. To one of the arms 321, it is provided a detection member 11 at a position where the position detecting sensor 10 can detect, the detection member 11 functioning as the standard position. The detection member 11 is positioned so as to pass the position detecting sensor 10 every the reel 3 rotates by one rotation. Further, the position detecting sensor 10 is formed so as to be able to output a detection signal every detection of the detection member 11 when the detection member 11 passes therethrough.

A speed reduction transmission mechanism 700 is arranged between a drive shaft of the stepping motor 49 and a rotation shaft of the reel 3, as shown in FIG. 3. This speed reduction transmission mechanism 700 transmits rotation of the stepping motor 49 to the rotation shaft of the reel 3 with a predetermined reduction ratio.

As shown in FIG. 3, the speed reduction transmission mechanism 700 has two gears, one of which is an output gear 71 put on the drive shaft of the stepping motor 49 and the other is an input gear 72 meshing with the output gear 71 and being arranged in the reel 3 so that the rotation center of the input gear becomes the same shaft center as the rotation shaft of the reel 3.

The reduction ratio of the above output gear 71 and the input gear 72 is obtained based on the ratio of the step number necessary for one rotation of the stepping motor 49 and the least common multiple calculated from the symbol number described on the reel 3 and the step number for one rotation of the stepping motor 49.

Figure 4A:
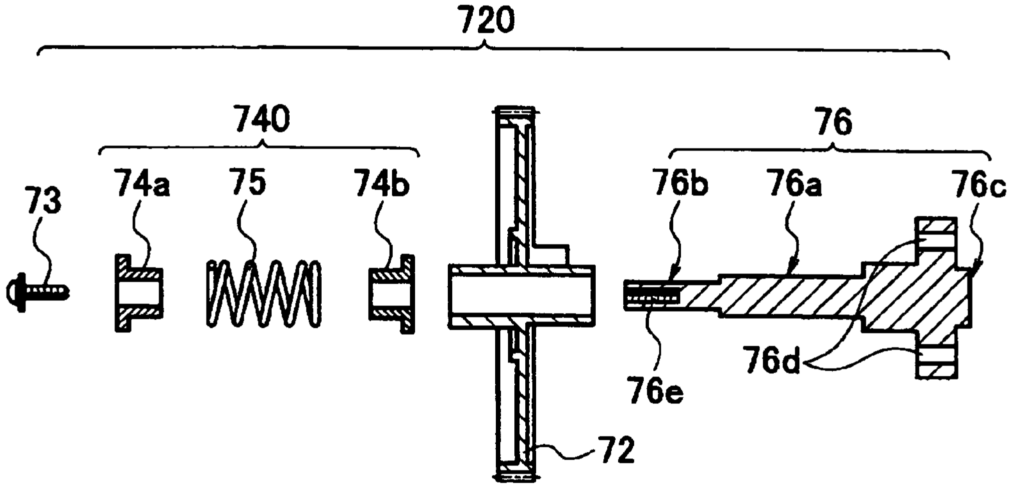
FIG. 4 is an explanatory view showing a shaft support portion of the reel in the embodiment.
Figure 4B:
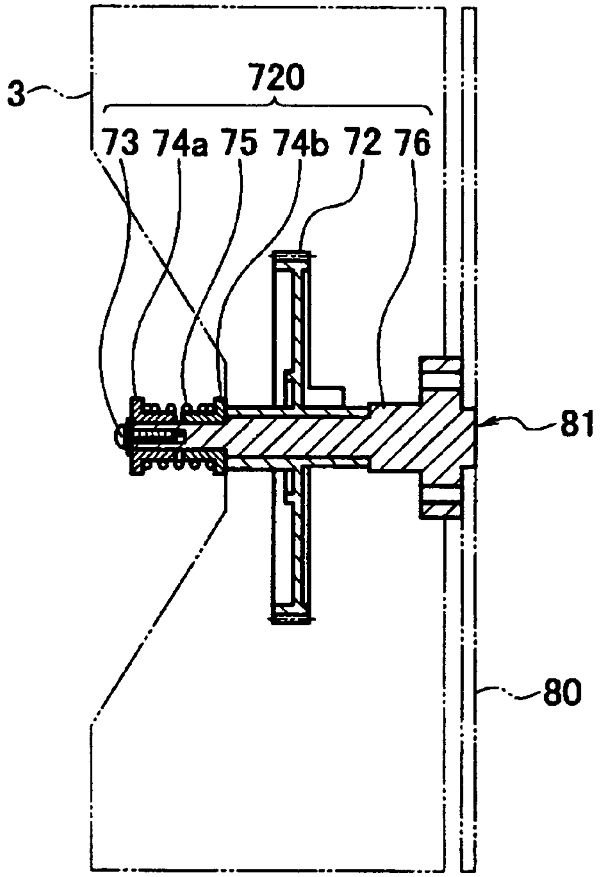
Figure 5:
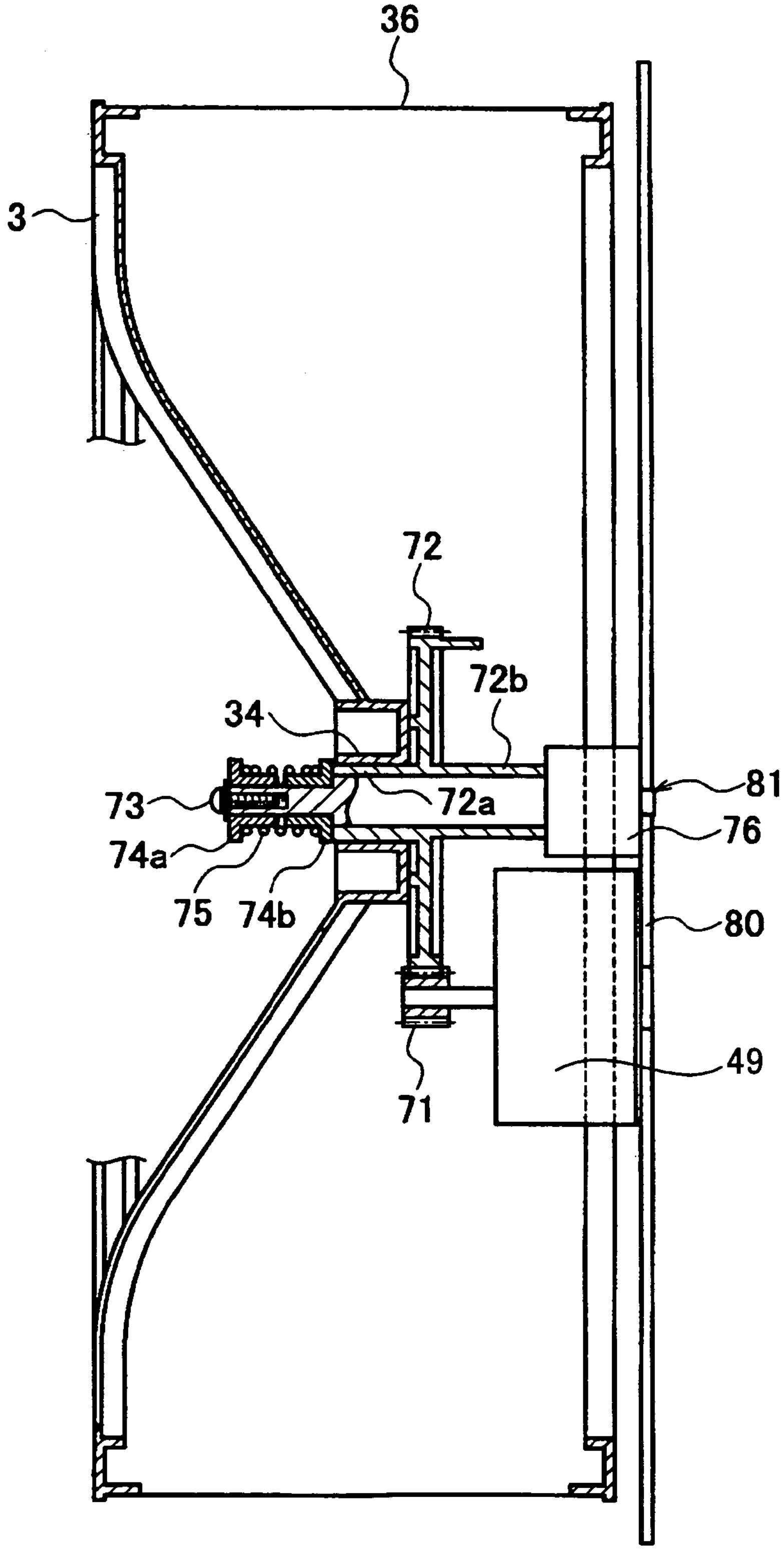
FIG. 5 is a sectional view showing a construction in which the shaft support portion is arranged on a support plate, in the embodiment.

FIG. 4A is an explanatory view indicating a construction of the shaft support part 720 for rotatably supporting the reel 3. FIG. 4B is an explanatory view indicating a construction for supporting the reel 3 by the shaft support part 720 arranged on the support plate 80. And FIG. 5 is a sectional view indicating a whole construction for supporting the reel 3 by the shaft support part 720.

As shown in FIG. 4A, the shaft support part 720 has a stopper screw 73, colors 74*a*, 74*b*, a vibration restraining member 75 and a reel post 76. The reel post 76 is provided with a rotation support portion 76*a* to which the input gear 72 is inserted and rotatably supported, a position fixing portion 76*b* to which a member for fixing the position of the reel 3 is inserted, a projection portion 76*c* which projected toward the support plate 80 from the bottom plane of the reel post 76 and is utilized for inserting the reel post 76 in a hole 81 formed in the support plate 80, screw holes 76*d* for fixing the reel post 76 to the support plate 80 by screws and a screw hole 76*e* in which the stopper screw 73 is fastened while the input gear 72 is inserted to the rotation support portion 76*a* and the colors 74*a*, 74*b* are inserted to the position fixing portion 76*b* while existing the vibration restraining member 75 therebetween, thereby the input gear 72 is prevented from coming off from the reel post 76.

The vibration restraining member 75 has function to brake rotation of the reel 3 when the reel 3 is rotating, based on stop control by the main CPU 31, and to decline vibration of the reel 3 and sway in a perpendicular direction to the surface thereof occurring when rotation of the reel 3 is stopped. As the vibration restraining member 75, springs can be utilized. In the embodiment, description will be done according that the spring 75 shown in FIG. 4A is used as the vibration restraining member. As shown in FIG. 4B, the input gear 72 is inserted to the rotation support portion 76*a*, the spring 75 is inserted to the position fixing portion 76*b* while being sandwiched between the colors 74*a* and 74*b*.

The above mentioned stopper screw 73 is, as shown in FIG. 4B, inserted and fastened to the screw hole 76*e*, thereby the colors 64*a*, 74*b* and the spring 75 inserted to the position fixing portion 76*b* are prevented from coming off therefrom. The spring 75, which is prevented from coming off by the stopper screw 73, presses the input gear 72 toward the support plate 80 through the color 74*b* by its resilient force. At that time, frictional force occurs between the input gear 72 and the support plate 80, thereby the spring 75 can decline vibration of the reel 3 occurring when the reel 3 is stopped.

As shown in FIG. 5, in the input gear 72, two cylindrical projection portions 72*a* and 72*b* are integrally formed from both sides of the plate portion. Both the cylindrical projection portions 72*a*, 72*b* are perpendicularly projected from both sides of the plate portion, thereby the rotation support portion 76*a* can be inserted through the cylindrical projection portions 72*a*, 72*b* along an axis passing through the center of the cylindrical projection portions 72*a*, 72*b*. The input gear 72 is inserted to the rotation support portion 76*a* so that one cylindrical projection portion 72*b* faces to the support plate 80. The other cylindrical projection portion 72*a* is pressed into the hole 34 formed at the center position of the reel 3. Therefore, when the output gear 71 is rotated, the input gear 72 and the reel 3 are rotated all together around the rotation support portion 76*a*.

Figure 6:
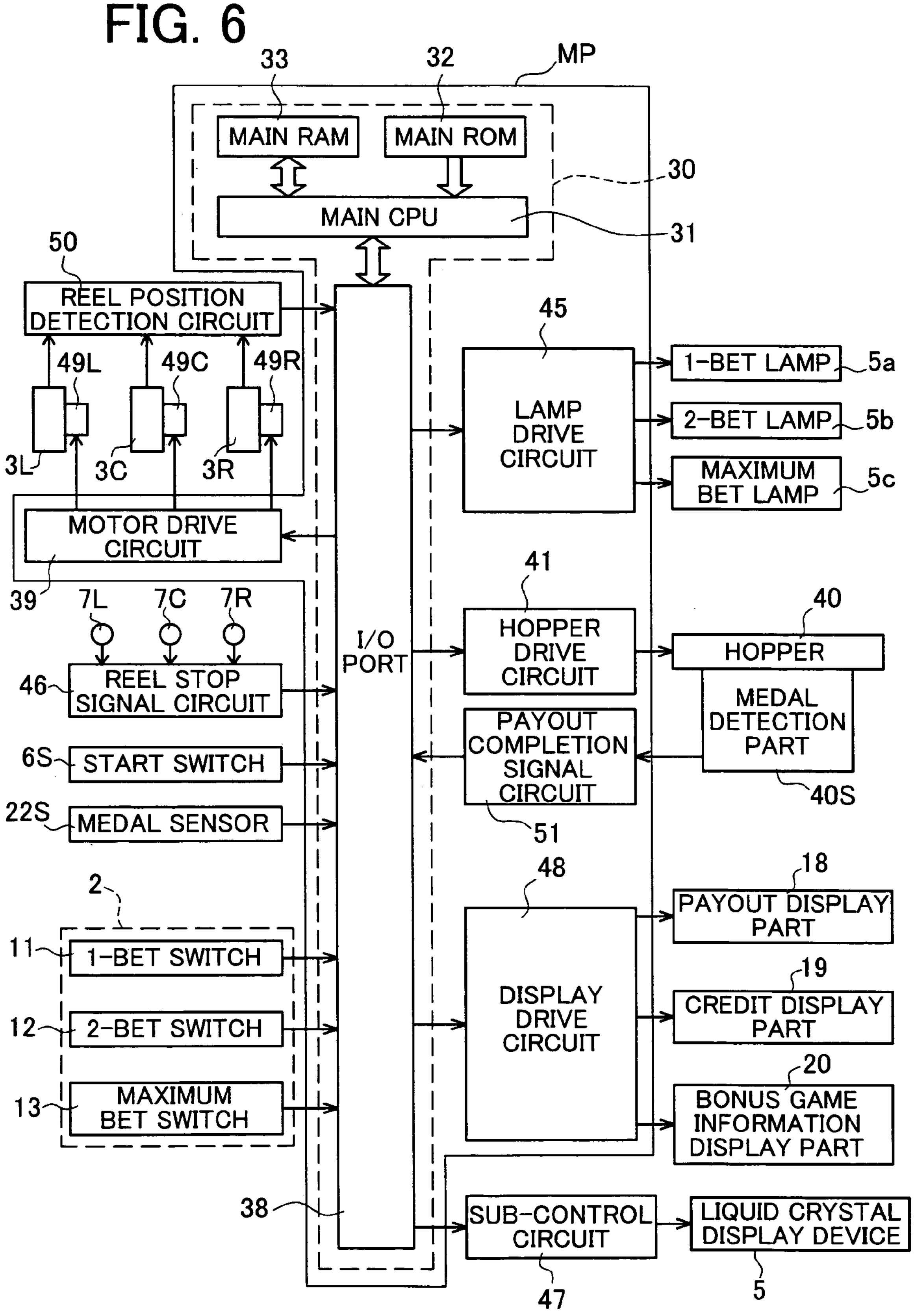
FIG. 6 is a block diagram of the reel-type gaming machine according to the embodiment.

FIG. 6 is a block diagram indicating an electrical construction of the reel-type gaming machine 1, including the motor stop control device. The motor stop control device is provided with the stepping motor 49, as the drive source of the reel 3 having a plurality of symbols, and stops the stepping motor 49 corresponding to an instruction command transmitted from an external.

As shown in FIG. 6, in a microcomputer MP, there are provided a main CPU 31 functioning as a main controller for mainly controlling and calculating, a main ROM 32 for storing programs and various data, a main RAM 33 utilized for data reading and writing, and a random number generator (not shown) for generating predetermined random number values.

Input parts such as a start switch 6S for detecting operation of the start lever 9, a reel stop signal circuit 46 for detecting operation of the stop buttons 7L, 7C, 7R, an input part 2 including BET switches 11~13 for betting credited coins by pressing thereof and output parts such as a motor drive circuit 39, a lamp drive circuit 45, a hopper drive circuit 41 and a display drive circuit 48 are connected to the main CPU 31.

The motor drive circuit 39 drives or stops the stepping motor 49 based on commands from the main CPU 31. Here, the stepping motor 49 is 4-phase motor and has four drive coils through A-phase to D-phase. And in the embodiment, each phase is defined so as to stand in order A-phase, B-phase, C-phase and D-phase in anti-clockwise direction. Further, A-phase and C-phase or B-phase and D-phase forms one pair and current running in one phase in the one pair of two phases has the reverse phase different from current running in the other phase in one pair.

Here, the motor drive circuit 39 sequentially excites the drive coil in each phase by 2-phase excitation based on a command (a control signal to drive the stepping motor 49) output from the main CPU 31, thereby the rotor in the stepping motor 49 is rotated and driven. On the other hand, the motor drive circuit 39 excites the drive coils in any two phases for a predetermined time based on a command (a control signal to stop the stepping motor 49), thereby the rotor in the stepping motor 49 is stopped.

The motor drive circuit 39 according to the embodiment constructs a motor drive device to drive the stepping motor 49 by applying a constant voltage to the stepping motor 49 when a drive instruction (a control signal output from the main CPU 31 based on an input signal from the start switch 6S) occurs according to an instruction form an external.

And the motor drive circuit 39 constructs a voltage applying device to repeatedly apply a voltage with on-time and off-time to the stepping motor 49 when an excitation current flowing in the stepping motor 49 reaches to a first current value due to the voltage applied to the stepping motor 49.

Further, the motor drive circuit 39 constructs a motor stop device to stop the stepping motor 49 by applying a constant voltage to the stepping motor 49 in a case that a stop instruction (a control signal output by the main CPU 31 based on an input signal from the stop buttons 7L, 7C, 7R) to stop the stepping motor 49 occurs based on an instruction from an external, the stop instruction being generated when rotation speed of the stepping motor 49 becomes constant. Here, it may be conceivable a case in which it is judged that the rotation speed of the stepping motor 49 becomes constant if the start switch 6S is turned on and a predetermined time (for example, 4.1 seconds) is elapsed, and it is judged that the rotation speed of the stepping motor 49 does not become constant if the start switch 6S is turned on and the predetermined time (for example, 4.1 seconds) is not elapsed.

The motor drive circuit 39 may stop the stepping motor 49 by applying a constant voltage to the stepping motor 49 if the excitation current flowing in the stepping motor 49 the rotation speed of which becomes constant does not reach to a second current value larger than the first current value when a stop instruction to stop the stepping motor 49 occurs based on an instruction from an external. Here, the second current value may be a current value excess of the maximum current value capable of flowing in the stepping motor 49.

Here, the motor drive control circuit 39 may or may not conduct a chopping control in which a voltage with on-time and off-time is repeatedly applied to the stepping motor 49 based on the control signal input from the main CPU 31, in spite whether the excitation current flowing in the stepping motor 49 reaches to the first current value or the second current value.

(Reel Stop Control Method by the Motor Drive Control Device)

Figure 7:
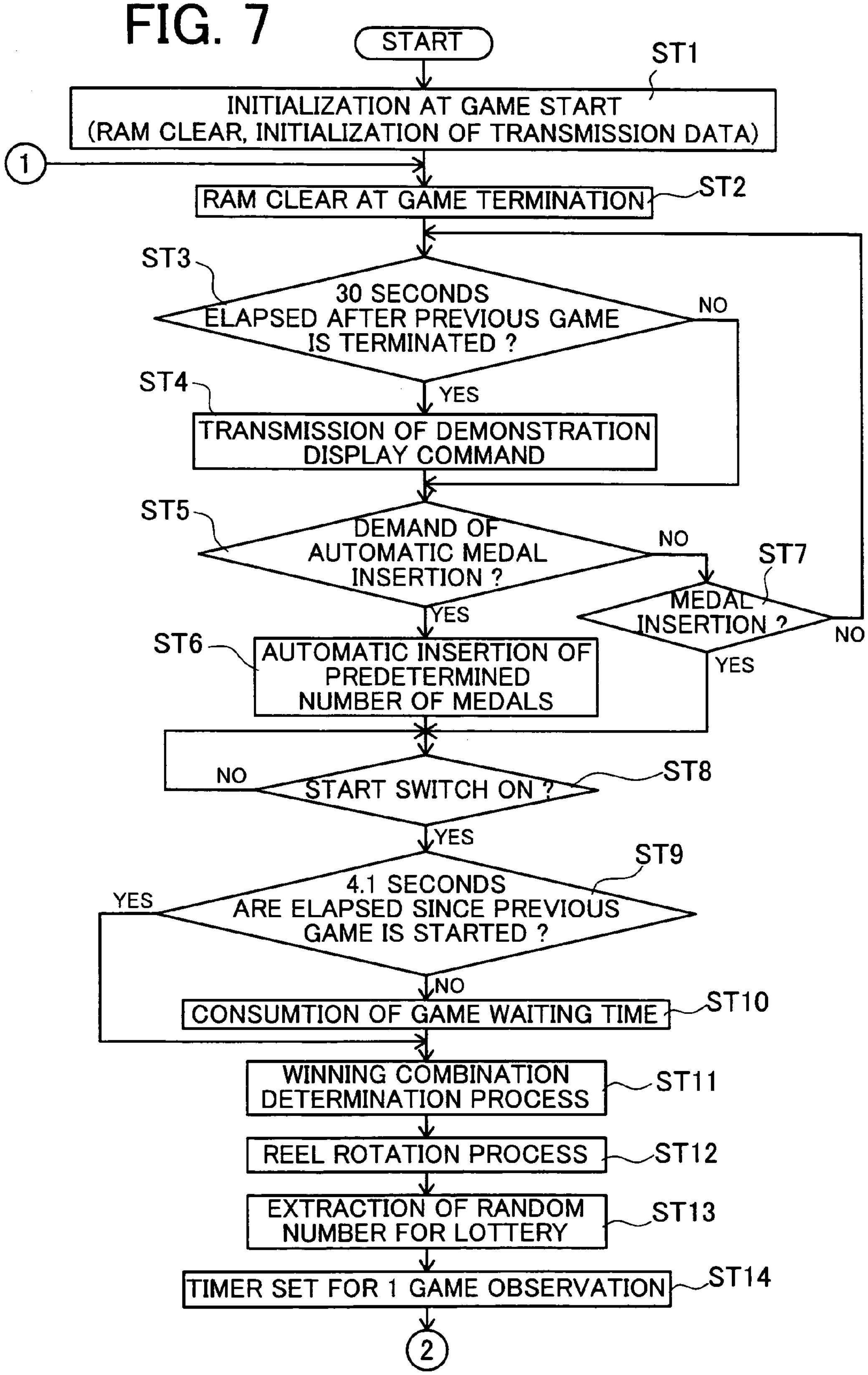
FIG. 7 is a flowchart showing procedures of the reel-type gaming machine according to the embodiment.
Figure 9:
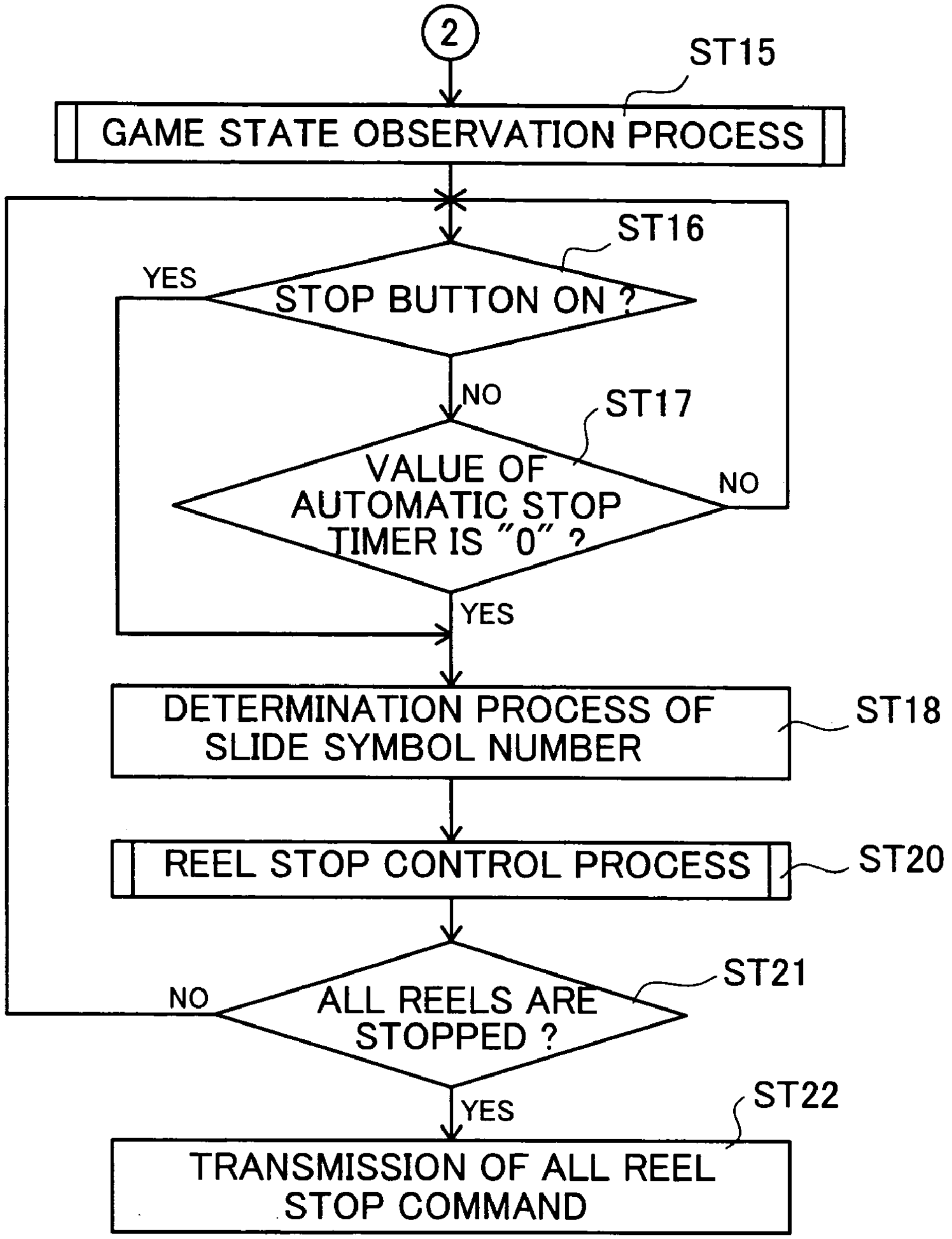
FIG. 9 is a flowchart showing procedures of the reel-type gaming machine according to the embodiment, the procedures being executed continuously to the procedures shown in FIG. 7.
Figure 10:
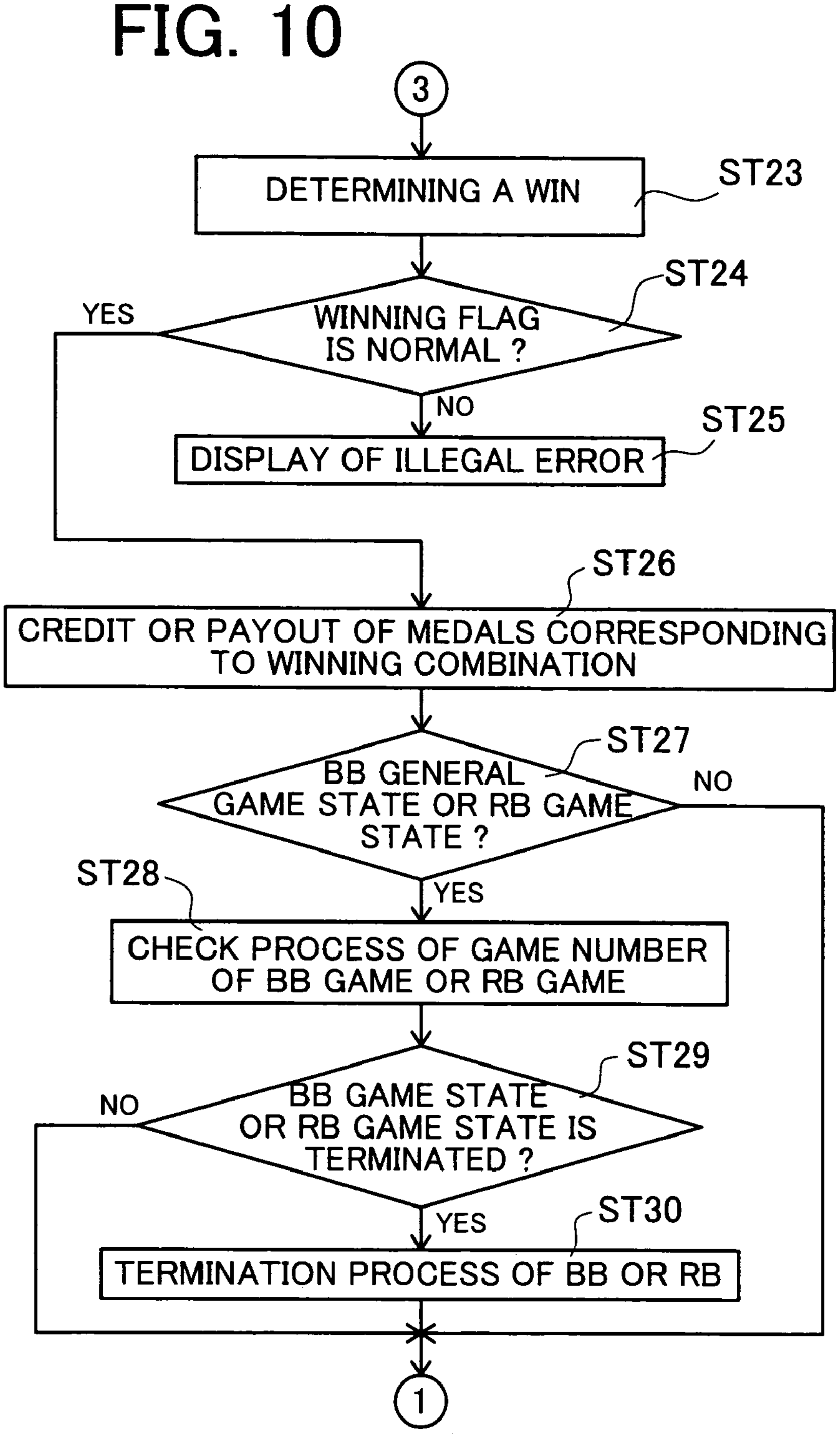
FIG. 10 is a flowchart showing procedures of the reel-type gaming machine according to the embodiment, the procedures being executed continuously to the procedures shown in FIG. 9.

The reel stop control method by the motor drive control device constructed according to the above will be executed by the following procedures. FIGS. 7, 9 and 10 are flowcharts showing operation of the motor drive control device.

As shown in FIG. 7, in step 1 (abbreviated as "ST1" hereinafter), the main CPU 31 initializes predetermined data (data stored in the main RAM 33, transmission data and the like).

In ST2, the main CPU 31 erases the data stored in the main RAM 33 at the time that the previous game is terminated. Concretely, the main CPU 31 erases parameters utilized in the previous game from the main RAM 33 and writes parameters utilized in the next game in the main RAM 33.

In ST3, the main CPU 31 judges whether or not 30 seconds are elapsed since the previous game is terminated (all reels 3L, 3C, 3R are stopped). In a case that 30 seconds are elapsed, the main CPU 31 executes the process in ST4, and on the other hand, if 30 seconds are not elapsed, the main CPU 31 executes the process in ST5.

Here, in ST4, the main CPU 31 transmits "demonstration display command" to display demonstration image to a sub-control circuit 47.

In ST5, the main CPU 31 judges whether or not the "replay", which is one of the winning combinations, is won in the previous game. In a case that the "replay" is won, the main CPU 31 executes the process in ST6, and if the "replay" is not won, the main CPU 31 executes the process in ST7.

Here, in ST6, the main CPU 31 automatically inserts a predetermined number of medals based on that the "replay" is won.

In ST7, the main CPU 31 judges whether or not medals are inserted by the player. Concretely, the main CPU 31 judges whether or not the switch signal is input from the medal sensor 22S or one of the BET switches 2*a*~2*c*. And in a case that such switch signal is input to the main CPU 31, the main CPU 31 executes the process in ST8. On the other hand, in a case that such switch signal is not input to the main CPU 31, the main CPU 31 executes the process in ST3.

In ST8, the main CPU 31 judges whether or not the star lever 9 is operated by the player. Concretely, the main CPU 31 judges whether or not the switch signal is input from the start switch 6S. And in a case that the switch signal is input from the start switch 6S, the main CPU 31 executes the process in ST9.

In ST9, the main CPU 31 judges whether or not 4.1 seconds are elapsed since the previous game is started. And in a case that 4.1 seconds are elapsed, the main CPU 31 executes the process in ST11, and on the other hand, in a case that 4.1 seconds are not elapsed, the main CPU 31 executes the process in ST10.

In ST10, the main CPU 31 invalidates the input from the start switch 6S till 4.1 seconds are elapsed since the previous game is started.

In ST11, the main CPU 31 determines the predetermined symbol combination as the winning combination based on a lottery result.

In ST12, the main CPU 31 transmits the instruction command to the motor drive circuit 39 so that the reels 3 are rotated.

Figures 8A, 8B, 8C:
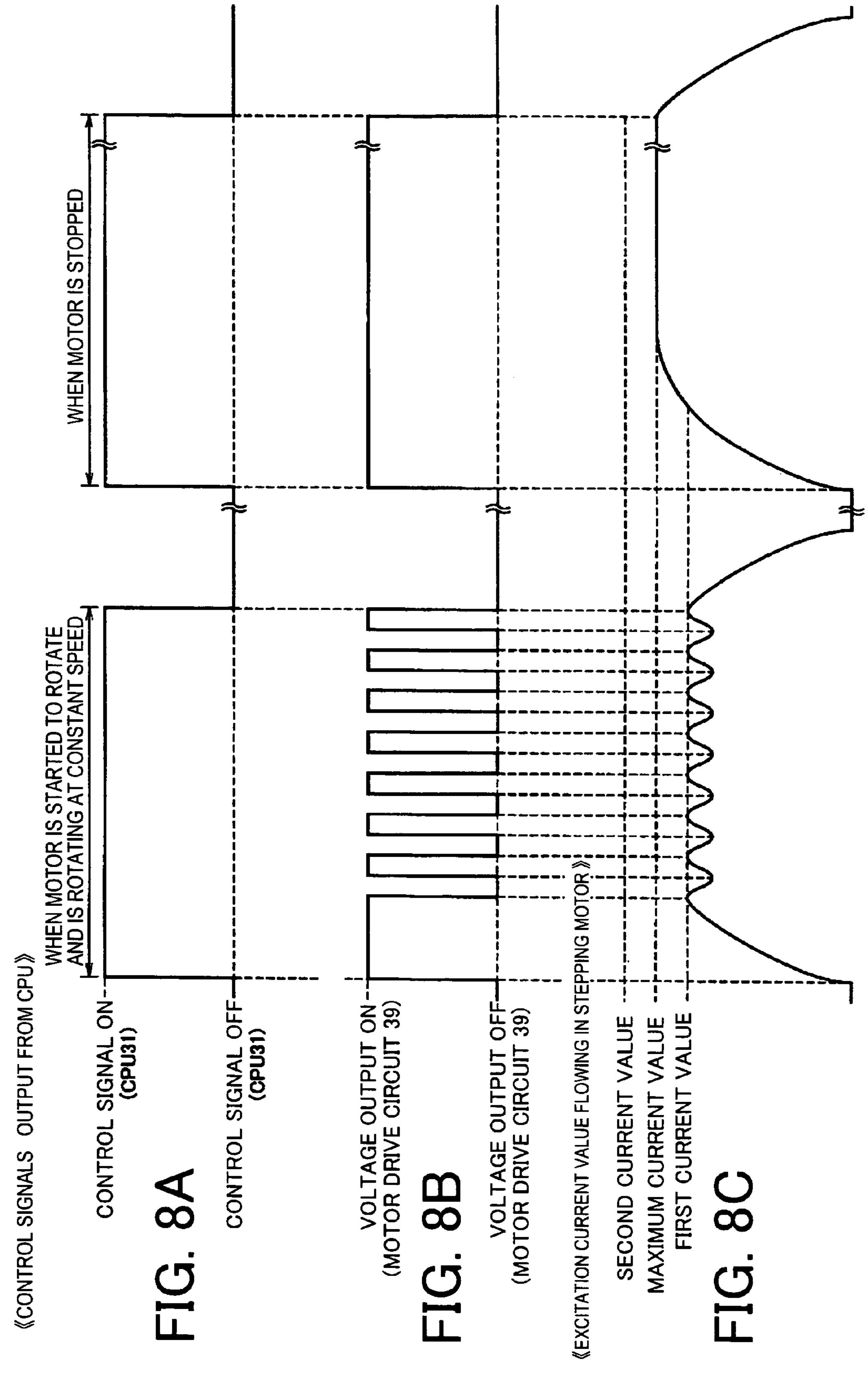
FIG. 8A shows a timing chart of the control signal output from a main CPU.
FIG. 8B shows a timing chart of the voltage applied to the stepping motor from a motor drive circuit and FIG. 8C shows a timing chart of the excitation current flowing the stepping motor.

Here, FIG. 8A is an explanatory view showing the timing chart of the control signal output from the main CPU 31. As shown in FIG. 8A, the main CPU 31 outputs the control signal, which instructs the motor drive circuit 39 so as to start rotation of the reel 3, to the motor drive circuit 39 (see "control signal ON" at the start of rotation of the reel 3), when the start lever 9 is operated by the player. On the other hand, the main CPU 31 in ST20 described later outputs the control signal, which instructs the motor drive circuit 39 so as to stop rotation of the reel 3, to the motor drive circuit 39, when the stop buttons 7L, 7C, 7R are pressed by the player.

FIG. 8B is an explanatory view showing the timing chart of the voltage output from the motor drive circuit 39. As shown in FIG. 8B, the motor drive circuit 39 sequentially applies the predetermined voltage to the drive coils of any two phases based on the control signal input from the main CPU 31 at the drive start of the stepping motor 49, and the motor drive circuit 39 sequentially and repeatedly applies the voltage with on-time and off-time to the drive coils of any two phases under a predetermined condition (when the excitation current reaches to the first current value at the drive start in FIG. 8C). On the other hand, as shown in FIG. 8B, the motor drive circuit 39 in ST20 described later continues to apply the predetermined voltage to the drive coils of any two phases for a predetermined time based on the control signal input from the main CPU 31 when the stepping motor 49 is stopped.

FIG. 8C is an explanatory view showing the excitation current flowing in the stepping motor 49. As shown in FIG. 8C, the excitation current gradually rises up when the predetermined voltage is applied to the stepping motor 49 from the motor drive circuit 39, and when the excitation current reaches to the first current value, the motor drive circuit 39 conducts the chopping control in which the voltage with on-time and off-time is repeatedly applied to the stepping motor 49 as shown in FIG. 8B. According to this, the excitation current flowing in the stepping motor 49 becomes a sawtooth current that the upper limit current value becomes the first current value. Here, the chopping control shown in FIG. 8B is repeatedly conducted with a period having, for example, a frequency of 30 kHz.

On the contrary, in ST20 mentioned later, the motor drive circuit 39 changes the excitation current, according to which the chopping control is conducted, to the second current value which is higher than the first current value based on the control signal from the main CPU 31 when the stepping motor 49 is stopped. This second current value is the current value excess of the maximum current value capable of flowing in the stepping motor 49. Here, for example, the maximum current value is calculated based on the voltage value applied to the stepping motor 49 and the resistance of wires in the stepping motor 49.

Based on that the second current value is the current value excess of the maximum current value capable of flowing in the stepping motor 49 and the excitation current, which flows in the drive coils when the stepping motor 49 is stopped, does not exceed the second current value, the motor drive circuit 39, as shown in FIG. 8C, does not conduct the chopping control but continues to apply the predetermined voltage to the drive coils of any two phases for a predetermined time.

As shown in FIGS. 8A to 8C, the motor drive circuit 39 conducts the process, in which the voltage applied to the stepping motor 49 is intermittently turned on and off by the chopping control of such voltage, when the reel is started to rotate and rotating at the constant speed, and conducts the process, in which the chopping control of the voltage applied to the stepping motor 49 is not done, when the reel 3 is stopped. This process done when the reel 3 is stopped is conducted in ST20.

In ST13, the main CPU 31 extracts the random number which is utilized for various determinations.

In ST 14, the main CPU 31 sets a predetermined time to the 1 game observation timer. Here, the 1 game observation timer includes an automatic stop timer to which a predetermined time is set in order to automatically stop the reels 3 without stop operation by the player.

In ST15, the main CPU 31 conducts the game state observation process.

In ST16, the main CPU 31 judges whether or not the stop buttons 7L, 7C, 7R are operated by the player. Concretely, the main CPU 31 judges whether or not the input from the reel stop signal circuit 46 is "on". And if such input from the reel stop signal circuit 46 is "on", the main CPU 31 shifts the procedure to ST 18. On the other hand, if the input from the reel stop signal circuit 46 is "off", the main CPU 31 shifts the procedure to ST17.

In ST17, the main CPU 31 judges whether or not the value of the automatic stop timer is "0". And if such value is "0", the main CPU 31 conducts the process in ST18. On the other hand, if such value is not "0", the main CPU 31 conducts the process in ST17.

In ST18, the main CPU 31 determines the slide symbol number.

In ST20, the main CPU 31 conducts the process to output the control signal, through which it is instructed to stop the reel 3, to the motor drive circuit 39.

Here, as shown in FIG. 8, when the reel 3 is stopped, the motor drive circuit 39 does not conduct the chopping control, in which the voltage applied to the stepping motor 49 is intermittently turned on and off, based on the control signal received from the main CPU 31.

Concretely, as shown in FIG. 8C, when the reel is stopped, the motor drive circuit 39 changes the threshold of the current to conduct the chopping control from the first current value to the second current value, based on the control signal received from the main CPU 31.

In this state, if the excitation current reaches to the changed second current value, the motor drive circuit 39 conducts the copping control in which the voltage with on-time and off-time is repeatedly applied to the stepping motor 49. However, as mentioned, since the second current value is set as the maximum current value which is far larger than the excitation current which is factually flows in the stepping motor 49 and as a result, the excitation current does not reach to the second current value when the reel 3 is stopped. Thereby, the motor drive circuit 39 continues to apply the predetermined voltage to the coils of any two phases for a predetermined time when the reel 3 is stopped.

Therefore, the motor drive circuit 39 conducts the chopping control in which the voltage with on-time and off-time is repeatedly applied to the stepping motor 49 at the time that the reel 3 is started to rotate and is rotating at the constant speed, thereby the stepping motor 49 can be efficiently driven. And since the chopping control is not done when the reel 3 is stopped, the constant voltage can be continuously applied to the stepping motor 49 for a predetermined time, accordingly the reel 3 can be stopped first.

And at the time that the reel 3 is stopped, the excitation current flowing in the stepping motor 49 becomes the current value larger than the first current value which flows when the reel 3 is started to rotate and is rotating at the constant speed, as shown in FIG. 8C, thereby the motor drive circuit 39 can stop the stepping motor 49 with strong braking force. As a result, the stepping motor 49 can very rapidly stop.

In ST21, the main CPU 31 judges whether or not all reels 3 are stopped. And if all reels 3 are stopped, the main CPU 31 conducts the process in ST21. On the other hand, if all reels 3 are not stopped, the main CPU 31 conducts the process in ST16.

In ST22, the main CPU 31 sets the command indicating that all reels 3 are stopped.

In ST23, the main CPU 31 refers the winning combination. Here, the reference of the wining combination means that the winning flag is set in order to distinguish the winning combination based on the stop mode of the symbols along the panel display windows 5L, 5C, 5R. Concretely, the main CPU 31 distinguish the winning combination based on the code numbers of the symbols stopped along the center pay line and the winning combination determination table (not shown).

In ST24, the main CPU 31 judges whether or not the winning flag is correct. And if the winning flag is correct, the main CPU 31 conducts the process in ST26. On the other hand, if the winning flag is not correct, the main CPU 31 conducts the process in ST 25.

In ST25, the main CPU 31 conducts the display of illegal error.

In ST26, the main CPU 31 stores or pays out the medals corresponding to the winning combination.

In ST27, the main CPU 31 judges whether game condition is the "BB general game state" or the "RB game state". And if game condition is the "BB general game state" or the "RB game state", the main CPU 31 conducts the process in ST28. On the other hand, if game condition is not the "BB general game state" or the "RB game state", the main CPU 31 terminates procedure.

In ST28, the main CPU 31 checks the BB game number and the RB game number. In this process, for example, the game number of the "BB general game state", the occurrence number of the "RB game state" in the "BB general game state", the game number in the "RB game state" and the winning number of times in the "RB game state" are checked.

In ST29, the main CPU 31 judges whether or not the "BB general game state" or the "RB game state" is terminated. And if games in the "BB general game state" or the "RB game state" are terminated, the main CPU 31 conducts the process in ST30. On the other hand, if games in the "BB general game state" or the "RB game state" are not terminated, the main CPU 31 conducts the process in ST2.

In ST30, the main CPU 31 clears the work area in the main RAM 33, the work area being used in the "BB general game state" or the "RB game state".

(Operation and Effect by the Motor Stop Control Device)

According to the embodiment, the motor drive circuit 39 is provided with the motor drive device for driving the stepping motor 49 by applying the constant voltage to the stepping motor 49 when the drive instruction to drive the stepping motor 49 occurs based on an instruction from an external, the voltage applying device for repeatedly applying the voltage with on-time and off-time to the stepping motor 49 when the excitation current flowing in the stepping motor 49 reaches to the first current value according to the voltage applied through the motor drive device, the motor stop device for stopping the stepping motor 49 by applying the constant voltage to the stepping motor 49 in a case that a stop instruction to stop the stepping motor 49 occurs based on an instruction from an external when the rotation speed of the stepping motor 49 becomes constant by the voltage applied through the voltage applying device. Thereby, it is executed the chopping control in which the voltage with on-time and off-time is repeatedly applied to the stepping motor 49 when the stepping motor 49 is started to rotate and is rotating at the constant speed and the stop control without the above chopping control is executed at the time that the stepping motor 49 is stopped. Accordingly, the motor stop control device can efficiently drive the stepping motor 49 and the constant voltage can be applied to the stepping motor 49 when the stepping motor 49 is stopped, therefore the reel 3 can be stopped first.

And when the stop instruction to stop the stepping motor 49 occurs based on an instruction from an external, in a case that the excitation current flowing in the stepping motor 49 rotating at the constant speed does not reach to the second current value larger than the first current value, the motor drive control circuit 39 stops the stepping motor 49 by applying the constant voltage to the stepping motor 49, thereby the current value, by which the above chopping control is executed at the time that the stepping motor 49 is stopped, is changed to the second current value (for example, the current value excess of the maximum current value capable of flowing in the stepping motor 49) larger than the first current value. Thus, as a result, the excitation current does not reach to the second current value. Therefore, the motor stop control device can control the stepping motor 49 so that the chopping control is not executed when the stepping motor 49 is stopped and the constant voltage can be applied to the stepping motor 49 so that the reel 3 can be stopped first.

Here, the present invention is not limited to the above embodiment and various modifications may be done within the scope of the present invention. For example, in the above embodiment, although the stop control of the reels 3L, 3C, 3R (the stop control of the stepping motor 49) is conducted based on the signal output from the reel stop signal circuit 46 when any one of the stop buttons 7L, 7C, 7R is pressed, the present invention is not limited to this. As the trigger to conduct the above stop control, various stop controls such as stop control signal output from the main CPU 31 or the like may also stop the reels 3L, 3C, 3R.

What is claimed is:

1. A motor stop control device for a gaming machine comprising a motor as a drive source of a reel on which a plurality of symbols are formed, wherein the motor stop control device stops the motor based on a motor stop instruction, the motor stop control device further comprising:

a motor drive device for driving the motor by applying a constant voltage to the motor based on a motor drive instruction;

a voltage applying device for applying a voltage with on-time and off-time to the motor when an excitation current value flowing in the motor reaches to a predetermined first current value baed on the constant voltage applied to the motor through the motor drive device; and a motor stop device for stopping the motor by aplying the constant voltage to the motor based on the motor stop instruction when a rotation speed of the motor becomes constant while the voltage with on-time and off-time is applied to the motor by the voltage applying device.

2. The motor stop control device according to claim 1, further comprising:

a threshold change device for changing a threshold from the predetermined first current value to a predetermined second current value based on the motor stop instruction;

wherein the predetermined second current value is set so as to become larger than a maximum current value capable of flowing in the motor.

3. The motor stop control device according to claim 2, wherein the maximum current value larger than the predetermined first current value flows in the motor when the constant voltage is applied to the motor through the motor stop device.

* * * * *